Figure 1:
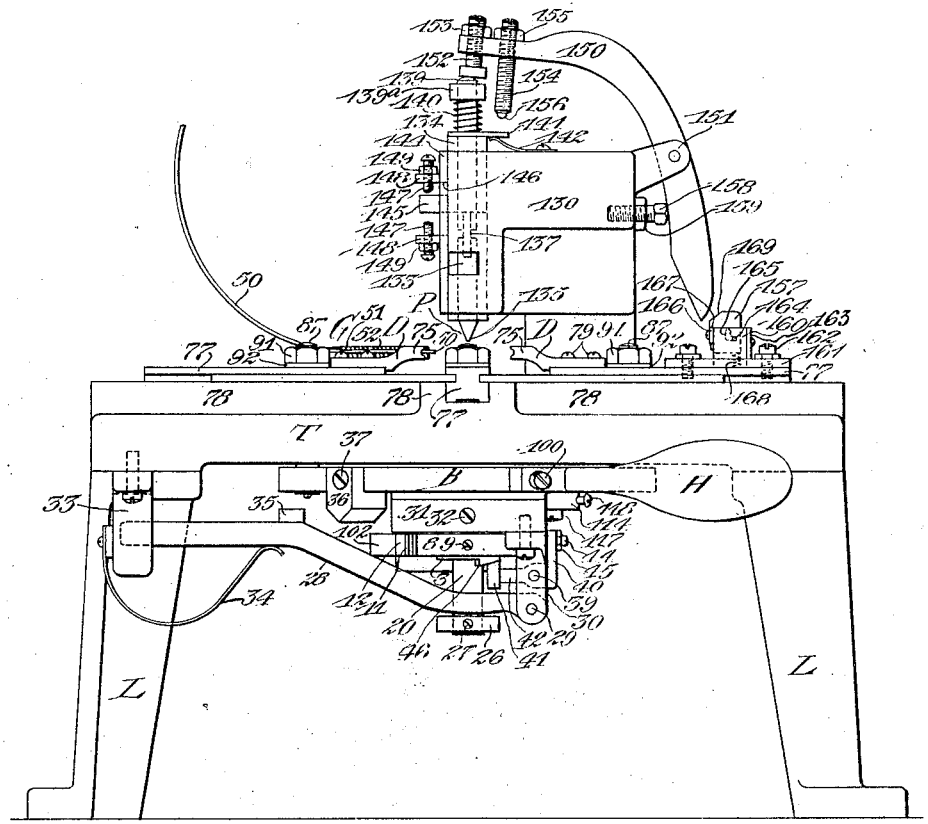

Dec. 11, 1923.  1,476,977
B. J. JACOBSON
AUTOMATIC CHAIN MAKING MACHINE
Filed July 3, 1920  5 Sheets-Sheet 1

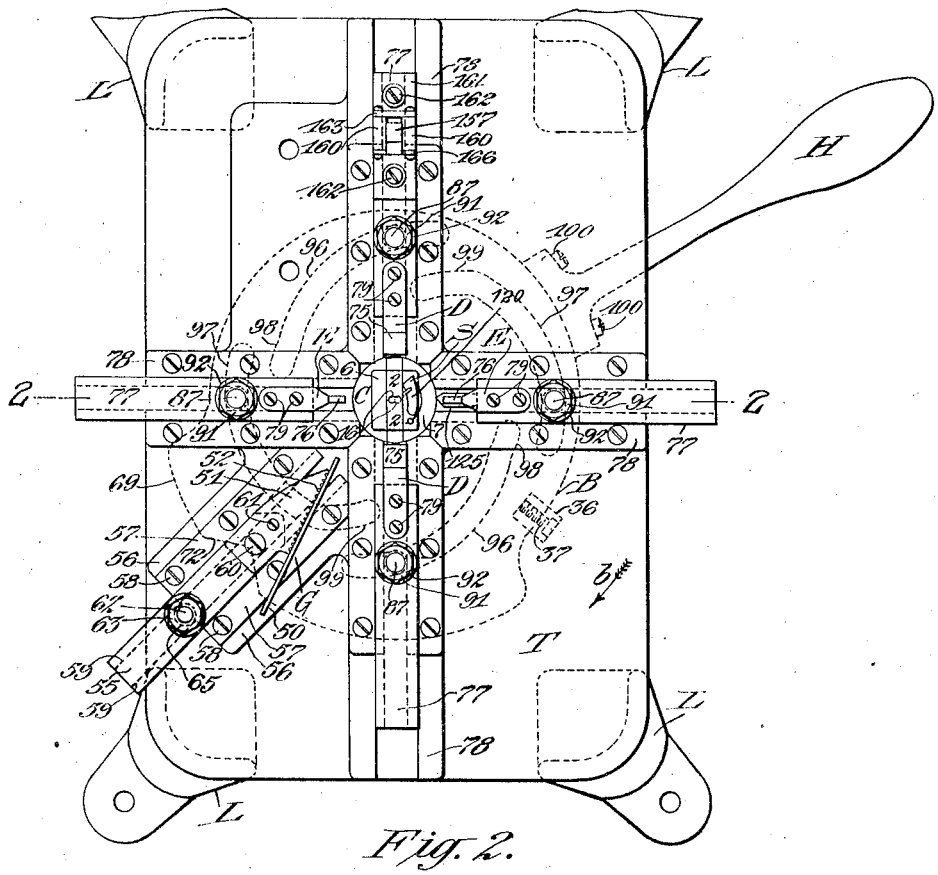

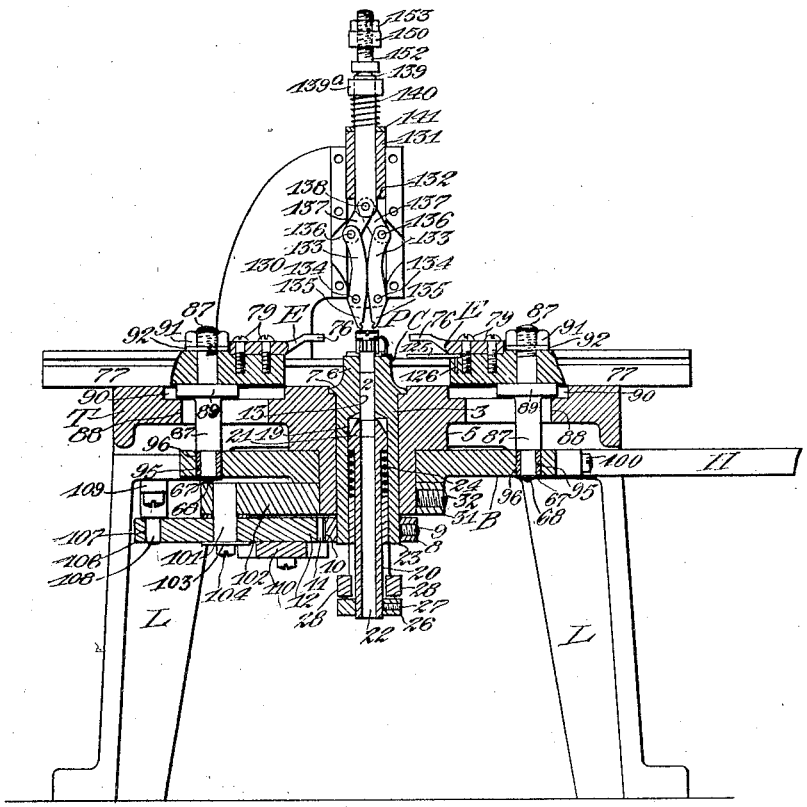

Dec. 11, 1923.　　　　　　　　　　　　　1,476,977
B. J. JACOBSON
AUTOMATIC CHAIN MAKING MACHINE
Filed July 3, 1920　　　　5 Sheets-Sheet 4
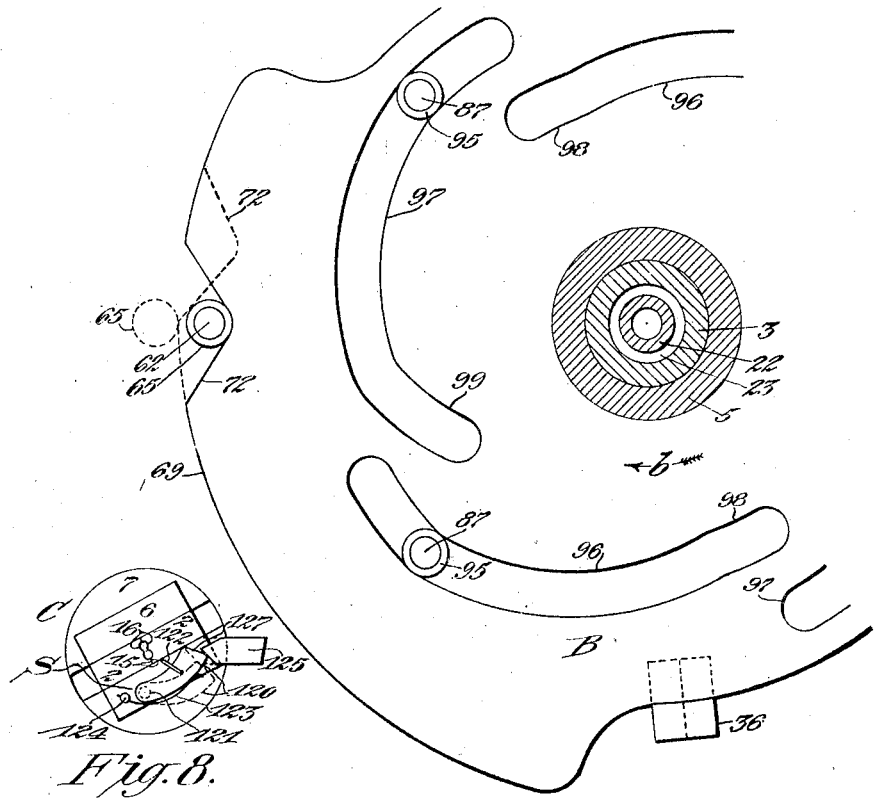
Fig. 8.
Fig. 7.
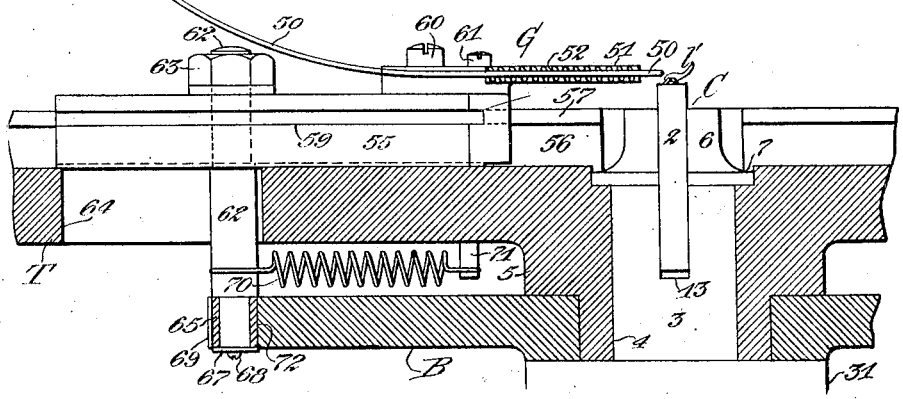
Fig. 6.
Inventor:
Bror J. Jacobson
By Arthur R. Armington
Attorney.

Dec. 11, 1923.  1,476,977
B. J. JACOBSON
AUTOMATIC CHAIN MAKING MACHINE
Filed July 3, 1920    5 Sheets-Sheet 5
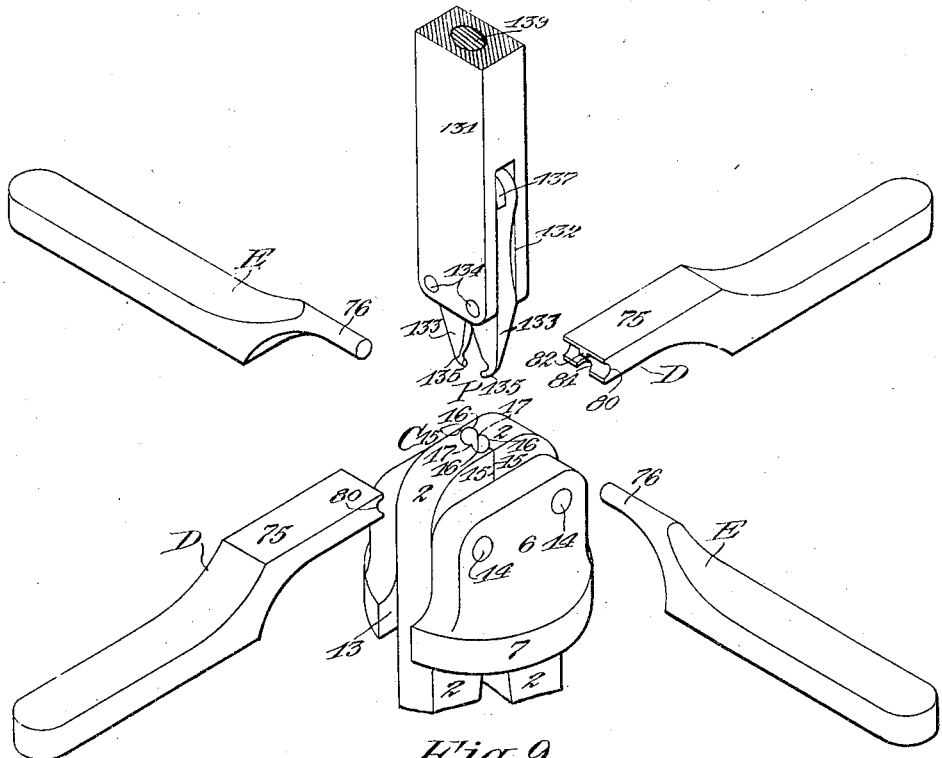
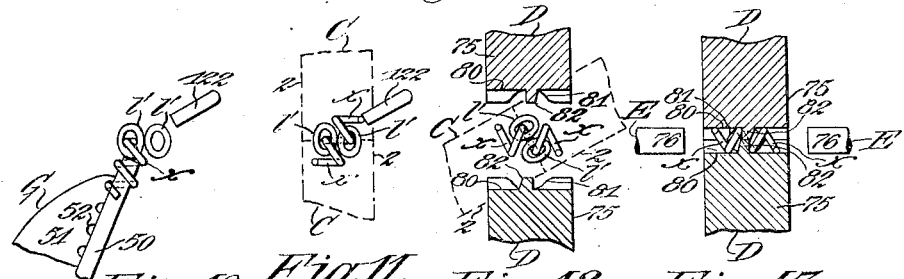
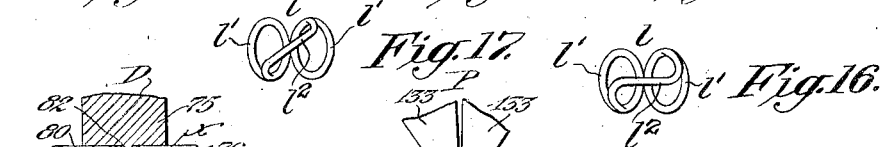
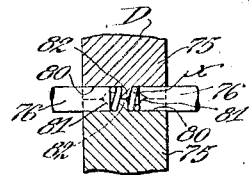

Patented Dec. 11, 1923.

1,476,977

UNITED STATES PATENT OFFICE.

BROR J. JACOBSON, OF PROVIDENCE, RHODE ISLAND, ASSIGNOR TO MARTIN-COPELAND COMPANY, OF PROVIDENCE, RHODE ISLAND, A TRUSTEESHIP.

AUTOMATIC CHAIN-MAKING MACHINE.

Application filed July 3, 1920. Serial No. 393,857.

*To all whom it may concern:*

Be it known that I, BROR J. JACOBSON, a citizen of the United States, residing at Providence, in the county of Providence, State of Rhode Island, have invented certain new and useful Improvements in Automatic Chain-Making Machines, of which the following is a specification.

My invention relates to improvements in chain-making machines for manufacturing "curbed" chains.

One object of the invention is to provide automatically-operated means for forming multi-loop chain links from lengths of coiled wire.

Another object of the invention is to provide a machine for automatically connecting the formed links in a continuous chain.

Another object of the invention is to provide automatically-operated means for grasping the individual links and twisting them into the desired shape to form a "curbed" chain.

Another object of the invention is to provide a machine which may be easily and conveniently operated to perform all of the several chain-making operations automatically to turn out the finished chain at a high rate of production, and with greater uniformity and improved quality in the product.

Further objects of the invention will appear from the description of its preferred embodiment as set forth in the following specification which is illustrated by the accompanying drawings. In the drawings:

Fig. 1 is a side elevation of the complete machine;

Fig. 2, a plan view of the same;

Fig. 3, a front elevation of the machine, shown part sectional on the line 2—2 of Fig. 2;

Fig. 4, an enlarged sectional view of the central chuck or work-holding means of the machine, taken on its vertical axis;

Fig. 5, an enlarged detailed plan view of the operating-mechanism for the chuck;

Fig. 6, an enlarged sectional elevation taken through the axis of the machine and showing the feeding-device for the wire-coils or link-blanks;

Fig. 7, a plan view of a portion of the cam which operates the blank-feeding device and link-forming tools;

Fig. 8, a plan view of the blank-locating device carried by the chuck;

Fig. 9, an enlarged perspective view of the chuck, the associated link-forming tools, and the superimposed pincers or link-seizing means for curbing the chain;

Fig. 10, an enlarged plan view of the link-feeding means of the machine, illustrating the manner in which the link-blanks or spiral coils of wire are delivered to the chain in process of manufacture;

Fig. 11, a similar plan view showing the manner in which the link-blank feeds into connection with the previously-formed end-link of the chain and brings up against the locating-device.

Fig. 12, a similar view showing the link-blank connected in place and about to be operated upon by the forming-tools;

Fig. 13, a similar view at the next stage in the operation where the two holding-tools or vise-jaws have closed against the link-blank and the opposite forming-tools are about to operate thereon;

Fig. 14, a similar view showing the link-forming tools completing their operation upon the link-blank;

Fig. 15, a vertical sectional view taken on the central axis of the machine and showing the chain held by the chuck with its last-formed end-link in the grasp of the pincer-jaws which twist the links to curb the chain;

Fig. 16, an enlarged, inverted plan view of the last-formed end-link of the chain showing the shape of its lower loop before the link is curbed; and Fig. 17, a similar view showing the shape of the bottom loop of the link after it has been twisted by the curbing operation.

*The machine in general.*—Referring to Figs. 1, 2 and 3 of the drawings, my improved machine comprises in general the following associated, cooperating mechanisms: a guide G for feeding link-blanks into the machine to connect them with previously-formed links; vise-jaws D for holding the blanks to be operated upon; tools E for closing the end loops of the blanks to form them into links; a chuck C for holding the completed chain by its end-link; and pincers P for seizing the formed links and holding them while they are twisted by the turning movement of the chuck to "curb" the chain.

*The chuck.*—In the embodiment of the invention as herein illustrated the various mechanisms of the machine are mounted on a bed or table T which may be supported from standards or legs L as shown in Figs. 1, 2 and 3. At the center of the table T is a rotatable chuck C, see also Figs. 4 and 9, around which the other coordinated devices are grouped. The chuck C is provided with cooperating jaws 2 for successively gripping the links of the completed portion of the chain to provide for twisting the end links to curb the chain. Referring particularly to Figs. 3 and 4, the chuck-jaws 2 are carried at the upper end of a sleeve or bushing 3 which is rotatable in the bore 4 of a central hub 5 formed on the under side of the bed or table T. The sleeve 3 is constructed with a head 6 at its upper end having a flanged rim 7 which seats in a counterbore at the top of the hub 5 in which it turns. At the lower end of the sleeve 3 is a collar 8 secured thereto by a set-screw 9, see Fig. 3. A slight clearance is provided between the collar 8 and the lower end of the hub 5 to allow the chuck C to be lifted slightly in its bearing for a purpose to be later explained. The collar 8 is formed with pinion teeth 10 extending around a portion of its periphery, see Fig. 5, and adapted to be engaged by teeth 11 on an arcuate rack or gear-quadrant 12 which serves as the means for turning the chuck C in the manner and for the purpose as later explained.

Referring again to Fig. 4, the chuck-jaws 2 consist of arms or levers of substantially rectangular shape in cross-section fitted to a central slot 13 cut through the upper end or head 6 of the chuck-sleeve 3. The jaws 2 are pivoted on cross-pins 14 driven through the sides of the slotted head 6, and their upper rounded ends project above the head with their opposite work-engaging faces 15 abutting in the axial plane of the chuck. Referring to Fig. 9, the gripping portion of each jaw 2 is formed with two adjacent concave recesses 16 which meet at the center in a sharp edge 17; so that when the ends of the jaws are closed together a double cavity is provided adapted to fit around the two end-loops of a chain link to hold it from turning in the chuck. As before indicated, the chuck C acts to grasp a completed link in the chain and to impart a rotary motion thereto while the last link to be added is held fast in the pincers P and twisted or curbed from the turning action of the chuck.

*The means for operating the chuck.*— The means for operating the chuck-jaws 2 to cause them to successively grip and release the finished links of the chain are shown most clearly in Fig. 4 and will now be described in detail. Fitted to slide vertically in the central bore 19 of the chuck-sleeve 3 is a tubular plunger 20 having an enlarged head 21 at its upper end formed with beveled sides adapted to act with a wedging effect on the correspondingly-beveled lower ends of the chuck-jaws 2. Beneath the head 21 the plunger 20 is reduced in diameter to form a hollow stem 22 which slides in the bore of a bushing 23 driven into the lower end of the chuck-sleeve 3. Between the upper end of the bushing 23 and the head 21 of the plunger 20 is a coiled spring 24 surrounding the stem 22 and adapted to force the plunger upwardly in its bearing to cause its beveled end to pry the jaws 2 apart at their lower ends. The action of the spring 24 on the plunger 20 thus serves to maintain the working-faces of the jaws 2 normally closed against the chain link with a yielding grip.

To release the jaws 2 from the work the plunger 20 is retracted against the force of the spring 24 through the means of positively-actuated devices as next described. Referring to Figs. 1 and 4 of the drawings, a collar 26 is fastened to the lower end of the plunger 20 by means of a set-screw 27. Straddling the sides of the plunger 20 is a yoke-shaped lever 28 formed with curved under sides which are adapted to bear against the upper face of the collar 26. The lever 28 is pivoted at 29 to a bracket 30 rigidly supported beneath the table T of the machine. As illustrated in Figs. 1 and 4, the bracket 30 is fastened to a collar 31 which surrounds the lower end of the hub 5 in which the chuck C has its bearing. The collar 31 is secured to the hub 5 by a set-screw 32 and serves as the means for holding in place the cam-plate B, to be later described, which rotates about the hub 5. Referring particularly to Fig. 1, the outer end of the lever 28 is guided in a forked or slotted bracket 33 and rests on the end of a curved flat spring 34 fastened to the bracket. The spring 34 holds the lever 28 raised slightly above the collar 26 so that the chuck 20 may be slid upwardly in its bearing to a slight extent without lifting the lever. On the outer arm of the lever 28 is a tapered lug 35 adapted to be engaged by the beveled sides of a cam-block 36. The cam-block 36 is fastened to the periphery of the cam-plate B by means of a screw 37, see Fig. 4, and as the cam turns on the central axis of the machine the beveled sides of the block 36 will ride across the lug 35 on the lever 28 to depress the latter to slide the plunger 20 downwardly to release its pressure on the chuck-jaws 2 whereby to open the jaws.

As before noted, the chuck C is adapted to be lifted bodily in its bearing to a slight extent and the clearance between the lever 28 and the collar 26 allows for this action without causing the lever to act on the plunger 20. The lifting of the chuck C is for the purpose of raising the chain link held in its jaws while its connected end-link is being twisted or curbed in the manner later explained, the means for effecting this lifting action being arranged as follows: Pivoted at 39 on the bracket 30 is a bell-crank lever 40, see Fig. 4, carrying a roller 41 on its horizontal arm 42. The opposite arm 43 of the lever 40 carries a stud 44 locked in place by a check-nut 45 and arranged with its end bearing against the side of the bracket 30. The stud 44 serves as a means for adjusting the lever 40 in position with its roller 41 bearing against the lower end of the chuck-sleeve 3. Referring to Fig. 1, the bottom of the sleeve 3 is formed with an inclined cam-track 46 which, when the chuck C is rotated, slides across the roller 41 and thus acts to lift the chuck bodily in its bearing.

*The blank-feeding means.*—The links of the chain manufactured in the machine are formed from spirals $x$ or helical coils of wire, see Figs. 10 and 11, which for convenience of description are herein termed link-blanks. The wire spirals or blanks $x$ are fed into the machine along a mandrel or guide G and are delivered therefrom to be connected with the completed part of the chain. As shown in Figs. 1, 2 and 6, the mandrel G consists of a length of relatively stiff wire 50 which is fastened to the angular edge of a base-plate 51 and curled rearwardly upward therefrom. The edge of the plate 51 is formed with a series of grooves 52 extending at an angle to the axis of the wire 50 or, in other words, having a pitch or lead therealong. Referring particularly to Figs. 2 and 6, the spiral link-blanks $x$ are slipped on over the outer end of the wire 50 and pushed down against the plate 51, then by rotating the blanks with the fingers they are caused to enter the grooves 52 in the edge of the plate to feed them out to the delivery-end of the guide G. The guide G is thus made to serve as a holder or magazine for the link-blanks $x$ and when it is required to feed a blank into the machine this is accomplished by rotating it off from the delivery-end of the wire 50, in the manner as shown in Fig. 10.

The guide or feeding-device G is mounted on a slide 55 to adapt it to be carried into position with the delivery-end of the wire 50 in close proximity to the axis of the chuck C; and to be withdrawn therefrom after the delivery of a link-blank so as not to interfere with the operation of the forming-tools which act upon the blank. The slide 55 slides in a slot or guideway formed by raised ways or tracks 56 on the top of the table T and is held in place by plates 57 fastened to the top of the tracks by screws 58 and having their edges engaging grooves 59 in the sides of the slide. The support or base-plate 51 for the mandrel 50 is fastened to the top of the slide 55 at its forward end by a screw 60, being adjustable pivotally thereon and secured in place by a second screw 61 extending through a slot in the plate.

Referring to Fig. 6, a stud 62 fastened to the slide 55 by a nut 63 reaches down through a slot 64 in the table T and carries a roller 65 at its lower end held in place by a washer 67 and screw 68. The roller 65 rides on the outer edge 69 of an extended section of the cam-plate B, being held thereagainst by a spring 70 fastened to the stud 62 with its opposite end anchored to a pin 71 on the under side of the table T. Cut into the edge 69 of the cam-plate B is a V-shaped notch 72, see Fig. 7, into which the roller 65 enters when the cam B is turned into first position at the start of operation of the machine. The engagement of the roller 65 with the notch 72 under the action of the spring 70 causes the slide 55 to move toward the center of the machine to carry the delivery-end of the guiding-mandrel 50 into proximity with the finished link with which the blank is to be connected; the method of operation of this part of the machine being more fully explained hereinafter.

*The link-forming tools.*—After the blank $x$ has been fed into connection with the end-link of the chain already formed it is operated upon by the forming-tools D and E carried by reciprocable slides movable radially inward toward the axis of the chuck C. The forming-tools D and E are arranged in pairs, two of them consisting of vise-jaws 75 adapted to be set up against the blank $x$ to hold it in place, see Figs. 9 and 13; and the other two taking the form of compression-tools 76 for acting against the loops at the ends of the blank to pinch them together as shown in Fig. 14. The several tools 75 and 76 are carried at the ends of slides 77 slidable in ways 78 arranged at right angles to each other and radially with respect to the axis of the chuck C, see Fig. 2. The slides 77 and their ways 78 are identical in construction with that of the slide 55 and ways 56 and therefore need not be further described, reference being had to Figs. 1 and 6, to illustrate the manner in which the slides are held in the ways.

As shown in Figs. 1 and 2, the tools 75 and 76 are secured to the forward ends of the slides 77 by means of screws 79 and their operating-portions are offset above the top of the slides to adapt them to slide into place above the jaws 2 of the chuck C. Referring to Figs. 9, 12 and 13, the working-ends of the vise-jaws 75 are rectangular in shape and formed with cylindrical grooves 80 adapted to receive the spiral loops of the link-blank $x$. The under side of the jaws are cut away at the center to provide an opening 81 for the next link in the chain connected to the link being held in the jaws, the finished portion of the chain being suspended therefrom and hanging down through the center of the chuck C as shown in Fig. 15. The concaved ends of the opposite jaws 75 also have central projecting lugs 82 set at an angle, as shown in Fig. 13, and adapted to enter between the end spirals or loops of the link-blank x. Referring to Fig. 13, the lugs 82 serve as stops or abutments to prevent the end loops of the blank x from being squeezed together at the center when the tools 76 are carried together to operate on the blank as shown in Fig. 14.

*The operating-means for the forming-tools.*—The four slides 77 for the tools 75 and 76 are operated automatically from the rotating cam-plate B. As shown in Fig. 3, the slides 77 carry vertical studs 87 extending downwardly through slots 88 in the table T and formed with flanges 89 abutting the under sides of the slides and slidable in grooves 90 in the table T. On the upper ends of the studs 87 are nuts 91 screwed down against washers 92 to secure the studs in place on the slides 77. The lower ends of the studs 87 are reduced in diameter to provide journals for rollers 95 which are held in place thereon by washers 67 and screws 68. The rollers 95 engage with eccentric cam-slots 96 and 97 in the cam-plate B, see Figs. 2 and 7, to impart a reciprocatory motion to the slides 77 when the cam is rotated in opposite directions about the axis of the machine. It will be noted by reference to Fig. 2 that the slots 96 which act upon the rollers on the slides carrying the vise-jaws 75 are inclined toward the axis of the cam B with a greater degree of eccentricity than that of the intermediate slots 97 which operate the compression or pinching-tools 76. This provides that when the cam B is rotated in the direction indicated by the arrow b, Fig. 2, the vise-jaws 75 will be moved toward the work at a faster rate than that of the tools 76 so that they will close against the link-blank x, see Fig. 13, before the tools 76 start to operate thereupon. It is also to be observed that the cam-slots 96 are formed at their inner ends with concentric portions 98; while the other cam-slots 97 have sharp, inward bends 99 at their corresponding ends. The holding-tools or vise-jaws 76 will thus be caused to dwell at the end of their inward movement, whereby to retain the link-blanks momentarily in their grip; while, on the other hand, the last part of the rotary movement of the cam B will cause the tools 76 to be carried against the ends of the blank x, see Fig. 14, with a quick action in the manner and for the purpose as hereinafter more fully explained.

Referring to Figs. 2 and 3, the cam B is operated manually from a handle H fastened to its periphery at 100 and projecting outwardly from the side of the machine. If desired, however, the cam-plate B which serves as the main operating-element for the several mechanisms of the machine could be connected to suitable driving-means to oscillate the cam under power. When the handle H is brought forward to turn the cam C in the direction indicated by the arrow b, Fig. 2, it brings up against one of the front table legs L to limit the extent of its throw; while its movement in the opposite direction is checked by the right-hand back leg.

*The means for rotating the chuck.*—As before stated, the chuck C is rotated from the oscillating movement of the cam B through the means of the gear-quadrant 12 engaging with its pinion 8, see Figs. 3 and 5. The quadrant 12 is pivoted on a stud 101 driven into the under side of an arm 102 projecting from the cam-supporting collar 31 which is fastened to the lower end of the central hub 5. A washer 103 and screw 104 hold the quadrant 12 in place on its pivot stud 101, and at its outer end is a triangular portion 106 provided with a slot 107 formed concentric with its axis. The slot 107 is engaged by the end of a pin 108 driven into the end of an elbow-shaped bracket 109 fastened to the under side of the table T. The pin 108 serves as a stop to limit the throw of the quadrant 12 for a purpose as later explained.

Fastened to the bottom of the quadrant 12 is an arm 110, see Fig. 5, having an arcuate cam-slot 111 at its outer end which is adapted to be engaged by a roller 112 carried on the under side of the cam-plate B. The roller 112 is mounted on a stud 113 riveted to a member 114 attached to the cam-plate B to provide for adjusting the position of the stud in relation to the axis of the cam. The member 114 is pivoted to the under side of the cam B by a screw 115, see also Fig. 1, and is formed with a slot 116 through which projects a stud 117 screwed into the cam. Two adjusting-screws 118 are screwed through the sides of the member 114 with their ends engaging the sides of the stud 117. By turning the screws 118 the member 114 may be swung on its pivot 115 to alter its position on the cam-plate B. It will be observed that as the cam-plate B is rotated in the direction indicated by the arrow b, Figs. 2 and 5, the roller 112 carried by the member 114 on its under side will act on the side of the cam-slot 111 to swing the quadrant 12 in the direction indicated by the arrow c, Fig. 5. This action causes the quadrant 12 to turn the pinion 8 with which it engages in the same direction as the cam B, but at a faster rate of movement. The continued movement of the cam B causes the roller 112 to ride out of the end of the cam-groove 111 as the end of the slot 107 in the quadrant 12 strikes against the limit-pin 108. Therefore, the chuck C will come to rest at this point while the cam B continues to rotate throughout the full extent of its oscillation to operate the link-forming tools. As the cam oscillates back in the opposite direction the roller 112 rides into the cam-groove 111 again and its action on the quadrant 12 is reversed to swing the latter to rotate the chuck C back to first position. The movement of the quadrant 12 in this reverse direction is checked by the engagement of the opposite end of its slot 107 with the stop-pin 108, the purpose of this device being to restrain the quadrant from swinging beyond the extent necessary to rotate the chuck C through approximately 90 degrees.

*The locating-means for the link-blanks.*— It has been explained above that the link-blanks $x$ are fed into the machine by means of the guide G from which they are delivered into position to intermesh with the previously formed links of the chain already completed. As the blank $x$ is fed off from the end of the mandrel 50 with a rotary motion, see Fig. 10, the leading end of the wire in the blank will be inserted through the two opposite loops 1' of the finished end-link 1 held in the chuck C. To prevent the blank $x$ from being fed too far through the link 1 with which it engages I provide a stop-device S, shown in detail in Fig. 8, which acts to locate the blank in mid position in relation to the axis of the chuck C. The stop-device S comprises an arcuate-shaped plate 120 pivoted on a pin 121 which turns in a bearing on the top of the chuck-head 6, see Figs. 2 and 8. Projecting upwardly from the end of the plate 120 is a wire 122 bent at right-angles above the upper end of the chuck-jaws 2 to bring its end into position to engage the end of the link-blank $x$ as shown in Fig. 11. At the start of the operation of the machine the stop-device S assumes the position shown in Fig. 2, the plate 120 being held with its forward end against the side of the chuck-head 6 by a curved spring 123, see Fig. 8, fastened to a pin 124 driven into the chuck. When the link-blank $x$ is operated upon by the forming-tools 76 it is necessary to move the stop S out of the way and this is accomplished by means of a pusher-element 125 carried on the right hand tool-slide 77, see Fig. 2. The pusher 125 consists of a flat bar fastened to the forward end of the slide 77 by a pin or rivet 126, see Fig. 3, and projecting forwardly therefrom. The forward end of the pusher 125 is beveled off on its sides to provide a pointed prow which engages with the inclined outer end 127 of the plate 120 after the chuck has been turned to the position shown in Fig. 8. This action causes the plate 120 to be turned back on its pivot 121 to the position shown by dotted lines in Fig. 8. As the tool 76 is withdrawn from the link-blank $x$ after forming the same it releases the plate 120 and the stop wire 122 is thus carried back into its first position by the pressure of the spring 123.

*The chain-curbing device.*—The means for curbing the links after they have been connected with the chain and bent into shape by the forming-tools comprises essentially a pair of automatically-operated pincers or grippers P for seizing the link and holding it while the chuck C is rotated to twist the link. Referring to Figs. 1 and 3, the pincers P are mounted in a standard or bracket 130 supported on the top of the table T overhanging the chuck C at the center of the machine. Reciprocable in a vertical slot in the overhanging arm of the bracket 130 is a slide 131 having a slot 132 extending from its bottom through the greater portion of its length. The opposite jaws 133 of the pincers P are pivoted on cross-pins 134 at the bottom of the slot 132 with their ends projecting downwardly beyond the slide 131. The projecting ends of the jaws 133 are reduced in thickness, see Fig. 9, and formed with hook-like extremities or beaks 135 adapted to be closed together to seize the opposite loops of the chain-link as shown in Fig. 15. The upper ends of the pincer-jaws 133 are pivotally connected at 136 to links 137 which, in turn, are pivoted at 138 to the end of a plunger-rod 139, thus forming a toggle connection between the pincers and plunger. The plunger 139 slides in a vertical bore in the slide 131 and is normally maintained in its uppermost position by a spring 140, whereby to hold the pincers P opened as shown in Fig. 3. The spring 140 is coiled around the plunger 139 and compressed between a collar 139ª on its upper end and a plate 141 fastened to the top of the slide 131. The plate 141 overhangs the rearward side of the slide 131, see Fig. 1, and rests upon the outer end of a flat spring 142 fastened to the top of the bracket 130, thus tending to hold the slide 131 in raised position with the pincers out of the way of the tools which operate on the link being formed. The slide 131 is held in its slot by a cover-plate 144 fastened to the forward side of the bracket 130, and a lug 145 on the front of the slide projects through a slot 146 in the plate. The lug 145 is adapted to be engaged by two opposite stop-screws 147 screwed through lugs 148 on the front of the plate 144 and held in place by check-nuts 149. By adjusting the screws 147 in their lugs 148 the throw of the slide 131 may be regulated in accordance with the extent of movement required for it to drop down to engage the pincers P with the link to be operated upon.

*The operating-means for the pincers.*—The slide 131 and the pincers P carried thereby are operated from a curved lever 150 pivoted on an arm 151 projecting from the rear of the bracket 130. The lever 150 carries a headed stud 152 at its outer end adapted to bear against the rounded upper end of the plunger-rod 129. The stud 152 is screwed through the lever 150 to render it adjustable in relation thereto, and is secured in fixed position thereon by a check-nut 153. A second stud 154 is screwed through the lever 150 and held in place by a check-nut 155 with its lower end formed with a rounded teat 156 adapted to engage the top of the plate 141 on the slide 131.

The lever 150 is operated by means of an abutment or latch-block 157 carried on the rearward vise-jaw slide 77, see Figs. 1 and 2. As shown in Fig. 1 the rearward arm of the lever 150 normally bears against the head of a stop-screw 158 screwed into the bracket 130 and held in place by a check-nut 159. The stop-screw 158 is adjustable to hold the lever 150 in position with its forward stud 152 resting on the top of the plunger 139. The latch-block 157 is mounted in a box-like socket 160 projecting upwardly from a plate 161 fastened to the top of the slide 77 at 162. The socket 160 is closed at its rearward end by a plate 163 and is provided on its sides with pins 164 projecting into an L-shaped slot 165 in the block 157. Fastened to the front of the socket 160 is a cross-plate 166 which is engaged by a stop-shoulder 167 on the front of the latch-block 157 to prevent the latter from tilting downward at its forward end. The slot 165 allows a limited horizontal and vertical movement of the block 157 in its socket 160 for a purpose as later explained. Normally, with the tool-slide 77 at the rearward end of its throw the block 157 is held in its raised position in the socket 160, see Fig. 1, by means of a coiled spring 168 bearing against its under side. The top of the block 157 is beveled off at 169 on its forward side and when the slide 77 moves forward on the table T the beveled face 169 strikes against the rounded lower end of the pincer-operating lever 150. The initial effect of this engagement will cause the block 157 to be slid rearwardly in its socket 160 with the horizontal portion of its groove 165 sliding on the pins 164. After the pins reach the vertical portion of the slot 165 the pressure of the lever 150 will cause the block to be depressed in its socket 160 so that it may ride under the end of the lever with a latch-action. As soon as the slide 77 has moved forward a sufficient extent to carry the block 157 beyond the end of the lever 150 the spring 168 will raise the block in its socket again. Now as the slide 77 moves back in the opposite direction the straight rearward side of the block will engage with the forward inclined side of the lever 150. The effect of this engagement will be first to slide the block forward in its socket to carry the horizontal portion of its slot into engagement with the pins 164 whereby the block will be locked against depression in its socket. The continued rearward movement of the slide 77 will then cause the block 157 to act positively on the beveled end of the lever 150 to rock the latter to force its upper arm downwardly to operate the slide 131 and pincers P in the manner and for the purpose as later explained.

The method of operation of the complete machine is as follows: To prepare the machine for operation a short length of chain is placed in the chuck C with the jaws 2 grasping the end link 1 as shown in Figs. 6 and 15. The chuck-jaws 2 are opened by pressing down on the lever 28 to cause it to withdraw plunger 20 from engagement with the jaws, see Fig. 4; and upon the release of the lever the plunger will slide upwardly again under the pressure of its spring 24 to close the jaws to grip the end link of the chain. The blanks x from which the chain is formed are prepared by winding a wire of suitable diameter into a spiral coil and cutting it into predetermined lengths. A supply of the wire spirals or blanks x are then placed on the mandrel 50 of the feeding-device G with the first few blanks engaged with the feed-grooves 52 in the edge of the plate 51.

Before starting to operate the machine the operating-lever or handle H is carried clear back against the rear leg L of the table T to cause the cam B to withdraw the rearward tool-slide 77 a sufficient extent to carry the latch or cam-block out from under the lever 150, see Fig. 1. With the parts in this position the operator grasps the handle H and draws it forward to turn the cam B in the direction indicated by the arrow b, Fig. 2. A relatively slight turning movement of the cam B brings the notch or recess 72 in its edge 69, see Fig. 7, into alinement with the center of the slide 55 which carries the blank-feeding guide G, see Figs. 6 and 7. The roller 65 carried by the stud 62 on the slide 55 will then ride into the notch 72 to allow the slide to be slid toward the axis of the machine under the action of its spring 70. In some cases the spring 70 is dispensed with and the slide 55 may be operated manually after the cam B has been brought into the position shown in Fig. 2; it being noted that in this view the slide is shown as being drawn clear back so as not to confuse the other parts of the drawing. Fig. 6 illustrates the slide 55 as drawn inwardly by the spring 70 and this action carries the feeding end of the blank-guiding mandrel 50 into close proximity to the loops 1' of the end link 1 which is being held in the chuck C. At this point the handle H is held at rest for an instant and the operator uses his left hand to feed a link-blank $x$ off from the end of the mandrel 50 by rotating it out of the grooves 52 in the plate 51. A slight twist of the blank under the touch of the fingers will cause it to feed from the end of the mandrel 50 into connection with the end loops 1' of the finished link 1 in the manner as shown in Fig. 10. As the blank $x$ screws down through one loop and up through the other, as shown in Fig. 11, the leading end of the spiral brings up against the stop-wire 122 carried by the locating-device S, see also Fig. 8, and at this juncture the blank will have been fed clear of the guiding-mandrel 50 and will be located centrally of the chuck C.

After the blank $x$ has been connected with the link 1 in the chuck C in the manner above described the operator continues the forward movement of the handle H to turn the cam B to effect the operation of the link-forming tools D and E. The initial movement of the cam B at this point will cause its notch 72 to act on the roller 65, see Figs. 6 and 7, to force the slide 55 outwardly whereby to move the blank-feeding device G out of the way of the forming-tools. As the cam B continues to turn forward the roller 112, see Fig. 5, carried by the member 114 on its under side, rides into the cam-groove 111 on the gear-quadrant 12 and acts to swing the quadrant about its pivot 101 in the direction indicated by the arrow $c$, Fig. 5. The quadrant 12 is thereby caused to act on the pinion 8 to rotate the chuck-sleeve 3, see Fig. 4, in the same direction as the cam B and the chuck C is thus turned to the position indicated by the dotted lines in Fig. 12.

During the movement of the cam B to rotate the chuck C the block 36 on its under side, see Figs. 1 and 4, rides across the top of the lug 35 on the lever 28 and depresses the latter against the action of its supporting spring 34. As the lever 28 is forced down against the collar 26 on the lower end of the plunger 20 the latter is drawn downwardly to remove the pressure from the ends of the clutch-jaws 2. This action allows the jaws 2 to open for an instant and the link 1 held at their upper ends will drop down until the link-blank $x$ strikes against the top of the chuck-jaws, bringing it into position to be grasped by the vise-jaws 75 as next explained.

The further continued movement of the cam B in the direction indicated by the arrow $b$, Figs. 2 and 7, causes the tool-slides 77 to move inwardly toward the axis of the machine under the action of the cam-grooves 96 and 97 engaging the rollers 95 carried by the slides. It has been explained that the cam-slots 96 have a greater pitch or inclination than the slots 97 so that the slides which carry the vise-jaws 75 move forwardly at a faster rate than the other slides to cause the jaws to grasp the link-blank $x$ before the tools 76 come into operation thereon. Referring to Fig. 12, it will be noted that the relatively slight turning-movement of the chuck C under the action of the cam B on the gear-quadrant 12, as above explained, brings the link-blank $x$ into position with its axis parallel with the working faces of the vise-jaws 75. At this point the roller 112 on the under side of the cam B rides out from the end of the slot 111 in the arm 110, see Fig. 5, and the gear-quadrant 12 is restrained from further movement by the engagement of the end of its slot 107 with the stop-pin 108. At this juncture the vise-jaws 75 are moving toward the blank $x$ as illustrated in Fig. 12 and finally they close against it as shown in Fig. 13. The two jaws 75 receive the blank $x$ in their concaved recesses 80 with the spacing lugs 82 entering between the two end loops of the blank. After the jaws 75 have grasped the blank $x$ they are held at rest for a brief interval while the rollers 95 on their slides 77 travel in the concentric portions 98 of the cam-grooves 96, see Fig. 7. At this point the rollers 95 on the slides 77 carrying the forming-tools 76 will enter the sharply inclined ends 99 of the cam-grooves 97 and the tools will be brought together with a quick motion to force their ends against the end-loops of the blank $x$, as shown in Fig. 14. The tools 76 are thus caused to operate on the blank $x$ with a pinching action to close its end loops while the latter are held apart by the spacing lugs 82 and thereby prevented from binding on the link 1 with which the blank is connected. As the tools 76 move into position to act on the blank $x$ the pusher 125 on the right hand slide 77 engages the beveled end 127 of the stop-wire plate 120, see Fig. 8, to swing it back out of the way in the manner as before explained.

After the blank $x$ has been formed in the manner as above described the cam B is turned back in the opposite direction to withdraw the tools from the work to allow the pincers P to seize the newly formed link to hold it during the curbing operation. The pincers P are operated from the return movement of the rearward tool-slide 77 and have a relatively quick action to seize the link before the chuck C is turned back to first position.

*The curbing operation.*—Referring to Figs. 1 and 2, the forward movement of the tool slide 77 carrying the latch-block 157 causes the latter to be depressed in its socket 160 as it slides under the end of the lever 150 in the manner as hereinbefore explained. After the block 157 passes inwardly beyond the lever 150 it is raised again by its spring 168 so that upon the return movement of the slide 77 it will act positively on the lever to operate the pincers P. As the slide 77 starts to move back the block 157 is immediately engaged with the end of the lever 150 and slid longitudinally of its socket 160 to cause the pins 164 to engage with the horizontal portion of the slot 165 in the block to lock it in its raised position. Now as the forward end of the block 165 is held by the cross-plate 166 its opposite end will act positively against the inclined side of the lever 150 to rock its upper arm downwardly. This rocking motion of the lever 150 causes its stud 152 to press the plunger 139 downwardly and as the spring 140 on the plunger is stiffer than the spring 142, see Fig. 1, the slide 131 will be carried down with the plunger. The slide 131 carries the pincers 133 and the latter are therefore lowered beneath the bracket 130 to bring their curved beaks 135 into close relation with the link last joined to the chain held in the chuck C. It has before been explained that the stop-screws 147 on the front of the bracket 130 are adjusted to regulate the throw of the slide 131, and the purpose of this adjustment is to regulate the position to which the pincers must be lowered in accordance with different sizes of chain being manufactured. As the lug 145 on the slide 131 comes against the lower screw 147 the slide is held from further movement and the continued movement of the lever 150 will then act to depress the plunger 139 with respect to the slide. This action causes the toggles 137, see Fig. 3, to operate the pincers P to engage their beaks 135 with the loops 1', 1' of the end chain-link as shown in Fig. 15. As the pincers come into action to seize the link to be curbed the stud 154 on the lever 150, see Fig. 1, comes down against the plate 141 at the top of the slide 131 to restrain the latter from rising.

It is to be understood that the above described operation of the pincers P takes place immediately the forming-tools D and E have been withdrawn from the newly formed link and before the cam B has been turned back far enough to engage the roller 112 on its under side with the cam-groove 111 on the gear-quadrant 12, see Fig. 5. As soon as the pincers have seized the link, however, the roller 112 starts to enter the cam-groove 111 and the further return movement of the cam B will then act to swing the quadrant 12 to rotate the chuck C. The chuck C is then turned back in the direction opposite to that indicated by the arrow $b$, Fig. 2, with a quick action. This rotative movement of the chuck C causes the link 1 held in its jaws, i. e., the link next to the end-link, to be turned to twist the end-link held by the pincers P and the chain is thereby curbed in substantially the same manner as when the operation is performed by hand. Fig. 16 is a bottom view of the last-connected end-link of the chain showing its form before it is curbed. It will be observed from this view that the two upper loops 1', 1' of the link are connected by a bottom loop $1^2$ which stands in a plane inclined to a plane extending through the centers of the end loops 1', 1'. Now, when the chuck C is rotated it turns the link held therein on the axis of the chain while the connected end-link 1 is held from turning by the grasp of the pincers P. This relative rotative movement between the two end-links of the chain causes the bottom loop $1^2$ of the last-connected link to be twisted spirally until it assumes a position in a plane coinciding with the axis extending through the centers of the two upper loops 1', 1' of this link. Fig. 17 shows the end-link 1 as finally curbed with its bottom loop $1^2$ standing in the plane bisecting the centers of the loops 1', 1' and it will be understood that this spiral twist given to the bottom loop $1^2$ of each link in the chain causes all of the links to assume a position with their end loops in alignment, or, in other words, it gives the desired curbed effect to chain. The twisting or curbing of each link tends to shorten it slightly and to prevent this action from stretching or straining the links the chuck C is given a slight upward movement in its bearing during the curbing operation. To effect this lifting action of the chuck C the inclined cam-face 46, see Fig. 1, is caused to travel across the roller 41 in the manner as before explained.

As the chuck C turns back into its first position, shown in Figs. 1 and 9, the cam-roller 112, see Fig. 5, will ride out from the end of the cam-groove 111 and further movement of the gear-quadrant 12 will be prevented by the stop-pin 108 in the slot 107. At this point the operation of the various mechanisms of the machine on the chain have been completed, but the cam B must be turned back still farther to move the rearward slide 77 sufficiently to withdraw the latch-block 157 from under the lever 150, see Fig. 1. It will be noted by reference to Fig. 2 that with the chuck C in first position the roller 95 on the slide 77 is still at a distance from the end of the cam-groove 97. Therefore, as the handle H is swung back to bring it up against the rear leg L of the table T the slide 77 will be slid back to a further extent. As the slide 77 moves back to the end of its rearward throw the latch-block 157 slides out from under the end of the lever 150 and upon the release of the latter the plunger 139 will be raised in the slide 131 under the action of the spring 140. The raising of the plunger 139 acts to open the pincers P, see Fig. 3, to release the link which has now been curbed, and after the pincers are free of the link the slide 131 will be raised by its spring 142, see Fig. 1.

After the parts of the machine have been carried back to first position in the manner last explained the operating handle H is drawn forward again to bring the blank-feeding guide G into operative relation with the chuck C once more, and after another blank has been fed into connection with the chain the same cycle of operations is repeated to form and curb the link in the manner as above set forth. As the cam B is turned forward each time the cam-block 36 on its periphery operates the lever 28 to release the chuck-jaws 2, and thus as each new blank is added to the chain the latter is allowed to feed down to a slight extent through the chuck. The engagement of the cam-block 36 with the lever 28 on the return movement of the cam B takes place after the end link of the chain has been seized by the pincers P and therefore the release of the chuck-jaws 2 for a brief interval has no appreciative effect in changing their grip on the links.

It will be observed from the foregoing description that I have provided a practically automatic chain-making machine which operates to connect the links and form the same into the required shape while also acting to twist each link after its connection to the other links to curb the chain. My improved machine may be operated without particular skill or expertness, and turns out a more uniform and superior product at a high rate of production.

I believe I am the first to provide a chain-making machine in which the links of the chain are curbed by seizing two separate links and twisting one of them relatively to the other, and I therefore claim this feature of the invention broadly without restriction as to the particular means employed. It is also to be understood that various modifications may be made in the structure and arrangement of the machine without departing from the spirit or scope of the invention; therefore, without limiting myself to the exact embodiment herein shown and described, I claim:

1. In a machine for making curbed chain, the combination of separate means for concurrently grasping two adjacent links in the chain, and means for effecting relative rotative movement between the two grasping-means to turn one of the grasped links in relation to the other whereby a portion of one of the links will be twisted to curb said link.

2. In a machine for making curbed chain, the combination of means for concurrently seizing two individual links of the chain, and means to operate said seizing-means to rotate one of the seized links in relation to the other on the longitudinal axis of the chain to cause a portion of one of said links to be twisted to curb said link.

3. In a chain making machine, the combination of means for forming a chain by progressively connecting multi-looped links, and means for curbing the chain, said means operating automatically to concurrently grasp separate links therein and to rotate one of the grasped links in relation to the other to twist a portion of each last link added to the chain to curb said chain.

4. In a machine for manufacturing chains of multi-looped links, the combination of means for holding a formed link, means for connecting a spiral wire blank with the formed link, and means for forming the blank into a finished link by closing its end coils while maintaining them in spaced apart relation in separate planes.

5. In a chain-making machine, the combination of means for progressively connecting wire links in a chain, means to simultaneously grasp two separate adjacent links of the chain, and means to operate the grasping means to rotate one link in relation to its next adjacent link to twist a portion of one of said links whereby to curb each link as it is added to the chain.

6. In an automatic chain-making machine, the combination of means for holding a formed link, means for feeding a link-blank into connection therewith, means to form the blank into a link, means to hold the previously formed link from turning, and means to seize the last-formed link and twist it to curb the chain.

7. In an automatic machine for making curbed chain, the combination of means for holding a link in the chain, means for seizing a separate adjacent link in the chain, and means for causing a relative turning movement between said holding and seizing means to twist the links one in relation to the other to curb the chain.

8. In an automatic machine for making curbed chain, the combination of a chuck for holding the chain by a link removed from the end link, automatically-operated pincers for seizing the end link of the chain, and means to cause a relative turning movement between the chuck and pincers to twist the links one in relation to the other to curb the chain.

9. In an automatic machine for making curbed chain, the combination with an automatically operated chuck for successively gripping the links of the chain, pincers for seizing each new link added to the chain while the previously formed link is held from turning in the chuck, and means to periodically cause a relative turning movement between the chuck and pincers to twist the links to curb the chain.

10. In an automatic chain-making machine, the combination of means for successively coupling links together, means for holding the completed portion of the chain at the link next adjacent the end link, means for seizing the end link, and means for operating the holding-means and seizing-means to twist the links to curb the chain.

11. In an automatic chain-making machine, the combination of a chuck for holding a formed link, means for feeding a wire blank into connection with the formed link held by the chuck, tools for operating on the blank to form it into a link, pincers for seizing the link after the forming operation, and means to operate the chuck to twist the link while it is held by the pincers.

12. A chain-making machine comprising the following coordinated automatically-operated instrumentalities: means for feeding lengths of wire into the machine, means for forming the wire lengths into connected links, means for simultaneously gripping separate adjacent links in the chain and means for operating the gripping-means to twist the links to curb the chain.

13. In an automatic chain-making machine, the combination of a rotary chuck for holding a formed link, means for feeding a wire blank into connection with the link held by the chuck, vise-jaws for gripping the blank, forming-tools for operating on the blank held by the jaws, pincers for seizing the link after it has been formed by the tools, and means for rotating the chuck to curb the link as it is held by the pincers.

14. In an automatic chain-making machine, the combination of a chuck for successively gripping the links of the chain, means to operate the chuck to cause it to release one link and engage an adjacent link, means for seizing the end link of the chain while the adjacent link is held by the chuck, and means to cause a relative turning motion between the chuck and seizing-means to twist the link to curb the chain.

15. In an automatic chain-making machine, the combination of a chuck for gripping the successive links of the chain, means for feeding a link-blank into connection with the link held by the chuck, means to form the blank into a link, means to seize the link after the forming operation, means to twist the seized link to curb the chain, and means to operate the chuck to cause it to release one link and to grasp the next succeeding link.

16. In an automatic chain-making machine, the combination of a chuck for gripping the links of the chain, means to operate the chuck to cause it to release one link and to grip the next succeeding link, means to progressively connect new links to the links held by the chuck, means to seize each added link, and means to cause a relative turning motion between the chuck and seizing-means to twist the links to curb the chain.

17. In a chain-making machine for producing chains of multi-looped links, the combination of a chuck for successively gripping the links of the chain, pincers formed with jaws adapted to enter the two opposite loops of the end link of the chain, means to operate the pincers to move toward the link and to close into engagement therewith, and means to cause a relative turning movement between the chuck and pincers to twist the link to curb the chain.

18. In a chain-making machine for producing chains of multi-looped links, the combination of pincers having jaws adapted to be inserted through the two opposite end loops of the individual links of the chain to hold them while they are twisted to curb the chain, and means to automatically operate said pincers to cause them to move toward the link and to close thereagainst to hold the link for an interval and to then release the link and recede therefrom.

19. In a chain-making machine for producing chains of multi-looped links, the combination of means for gripping the chain, pincers having jaws adapted to be inserted through the opposite end loops of the individual links of the chain, and means for automatically operating said pincers to cause them to move toward the chain and close against a link to hold the same during the curbing operation and to then release said link and move away therefrom while repeating the operation progressively on each link in the chain.

20. In an automatic chain-making machine, the combination of means to form the chain by successively joining links together, means for holding the chain at different points along its length, pincers for seizing a separate link in the chain beyond the link held by the holding-means to curb the latter, means to move the pincers toward the chain, means to cause the pincers to close against the end link of the chain, means to effect a turning movement between the pincers and chain-holding means, and means to cause the pincers to release the link and move away therefrom and to continue said operation progressively as each link is added to the chain.

21. In a chain-making machine for producing chains of multi-looped links, the combination of means for holding the chain by one of its links, a slide movable toward the chain-holding means, pincers pivoted to the slide and formed with jaws adapted to be inserted through the two opposite loops of the end link of the chain, a toggle connected to operate the pincers, resilient means for holding the pincers open, and means to operate the toggle to close the pincers against the end link of the chain.

22. In a chain-making machine, the combination of means for automatically seizing the successive links in the chain comprising a slide, pincers pivoted on the slide, a plunger slidable in the slide, toggles connecting the plunger to operate the pincers, means to operate the plunger to move the slide, and means to arrest the operation of the slide to cause the plunger to operate the pincers.

23. In a chain-making machine, the combination of a slide, pincers carried by the slide, a plunger, means connecting the plunger to operate the pincers, means for operating the plunger to close the pincers, a spring for operating the plunger to open the pincers, and a second spring for operating the slide to withdraw the pincers from operative position.

24. In a chain-making machine, the combination of a slide, pincers carried by the slide, a plunger slidable in the slide, means connecting the plunger to operate the pincers, a spring for sliding the plunger to open the pincers, a second spring for moving the slide to withdraw the pincers from the work, and means operating on the plunger to cause it to first move the slide and to then close the pincers.

25. In a chain-making machine, the combination of a pair of pincers, means to move the pincers toward the chain, means to close the pincers against a link in the chain, means to open the pincers to release the link, means to move the pincers away from the chain, and means to adjust the range of movement of the pincers to regulate their operative position in relation to the chain.

26. In a chain-making machine, the combination of means for holding the chain, a guide for receiving spiral coils of wire to be fed to the chain, means to move said guide into position to deliver the wire coils to the chain held in the holding-means, and means to withdraw the guide after a coil has been delivered therefrom to allow the coil to be operated upon to form it into a link.

27. In a chain-making machine, the combination of means for feeding a spiral coil of wire into the machine, means for grasping the sides of the coil, and means acting against the ends of the coil to close its loops to form it into a link.

28. In a chain-making machine, the combination of means for holding a formed link, means for feeding a spiral coil of wire into connection with the formed link, and means acting against the ends of the coil to close its loops to form it into a link.

29. In a chain-making machine, the combination of means for holding a formed multi-looped link, means for feeding a spiral wire blank into connection with the formed link, means for grasping the blank and holding its end loops apart, and means acting against the ends of the blank to close its loops to form it into a link.

30. In a chain-making machine, the combination of means for holding a formed multi-looped link, means for feeding a spiral wire blank into connection with the formed link, a pair of vise-jaws adapted to close against the blank, said jaws formed with means for holding the end loops of the blank in spaced relation, and forming tools adapted to enter between the vise-jaws to compress the end loops of the spiral into closed relation.

31. In a chain-making machine, the combination of means for feeding spiral wire blanks into the machine, vise-jaws for grasping the sides of the blank, forming-tools for acting on the ends of the blank to close its end loops, and means to first engage the vise-jaws with the blank and to then cause the forming-tools to act thereon.

32. In a chain-making machine, the combination of means for feeding spiral wire blanks into the machine, slidable vise-jaws for engaging the sides of the blank, slidable forming-tools for acting on the ends of the blank, a cam, and means operated from the cam to first slide the vise-jaws into engagement with the blank and to then force the forming-tools against the ends of the blank.

33. In a chain-making machine, the combination of means for feeding wire blanks into the machine to connect said blanks with links of the chain previously formed, a stop-device for locating the blank in connection with the previously-formed link, tools for forming the blank into a link, and means for moving the stop-device out of the way of the forming-tools as the latter come into operation on the blank.

34. In a chain-making machine, the combination of a chuck for holding a chain link, means for feeding a wire blank into connection with the link held in the chuck, a stop-device for locating the blank in position in relation to the link in the chuck, tools for operating upon the blank to form it into a link, and means to move the stop-device out of the way as the tools come into operation on the blank.

35. In an automatic chain-making machine, the combination of a chuck for holding a chain link, means for feeding a wire blank into connection with the link held in the chuck, tools for operating upon the blank to form it into a link, pincers for seizing the link after its release from the forming-tools, means to turn the chuck to curb the link while it is held by the pincers, and means to successively release the chuck from one link and engage it with the next link as each new link is added to the chain.

36. In a chain-making machine, the combination of a chuck for holding a chain link, means for feeding a wire blank into connection with the link held by the chuck, means for forming the blank into a link, means for turning the chuck to bring the blank into position to be operated upon by the forming-means, means for seizing the formed link, and means for reversing the motion of the chuck to twist the link to curb the chain.

37. In a chain-making machine, the combination of a chuck for holding a chain link, means for feeding a wire blank into connection with said link, tools for forming the blank into a link, a cam for operating the tools, pincers for seizing the link after the forming operation, and means operated from the cam to turn the chuck to curb the link while it is held by the pincers.

38. In a chain-making machine, the combination of a rotary chuck having means for grasping a link in the chain, means to rotate the chuck, and means operated from the rotating-means for the chuck to cause it to release one link and engage the next succeeding link in the chain.

39. In a chain-making machine, the combination of a chuck having jaws for grasping a link in the chain, resiliently-operated means for maintaining the jaws in engagement with the link, and means to periodically release the chuck-jaws from one link to allow them to grasp the next succeeding link in the chain.

40. In a chain-making machine, the combination of a chuck having pivoted jaws for grasping a link in the chain, a plunger engaging the ends of the jaws to hold them in engagement with the link, a spring for operating the plunger, and means to slide the plunger to release the jaws from the link.

41. In a chain-making machine, the combination of a chuck having concaved jaws for engaging a link in the chain, a plunger engaging the ends of the jaws to cause them to grasp the link, a spring for operating the plunger, a lever for releasing the plunger from the jaws and means to operate the lever to cause the jaws to successively release one link and engage the next succeeding link in the chain.

42. In a chain-making machine, the combination of a rotary chuck for engaging the successive links in the chain, means for connecting a wire blank with the link held in the chuck, means for forming the blank into a link, means for turning the chuck to curb the link, and means to release the chuck from one link and engage it with the next succeeding link in the chain.

In testimony whereof I affix my signature.

BROR J. JACOBSON.